(No Model.)
J. P. WRIGHT.
MATCH BOX.
No. 521,903. Patented June 26, 1894.
Fig. 1.
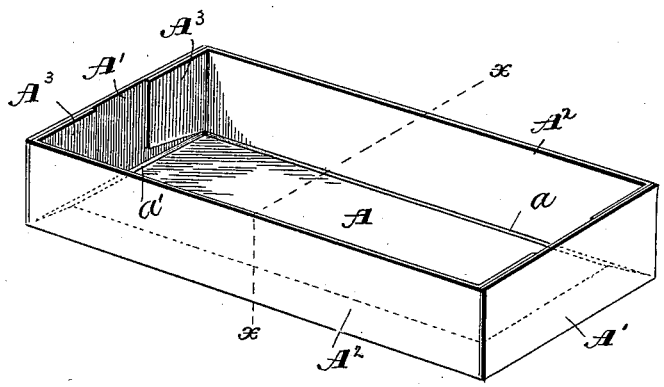
Fig. 2.  Fig. 3.
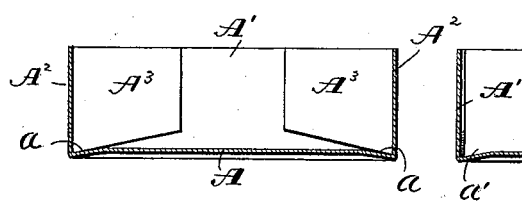 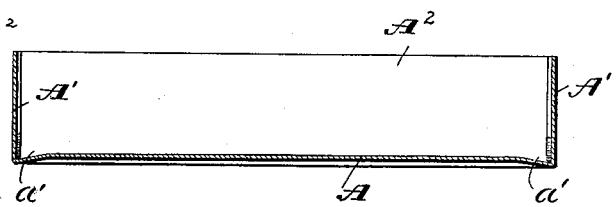
Fig. 4.  Fig. 5.
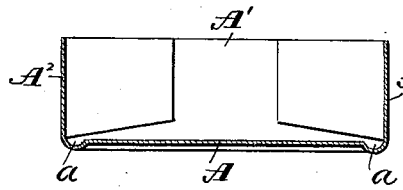 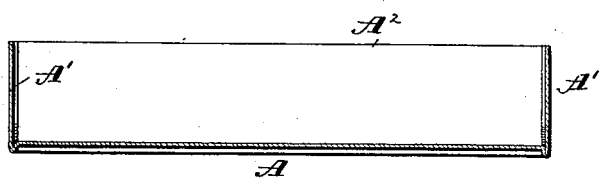
Fig. 6.  Fig. 7.
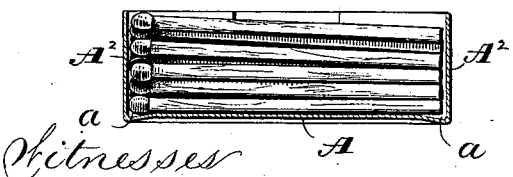 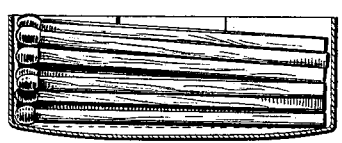
Witnesses
Chas. J. Williamson.
Jas. E. Hutchinson.
Inventor
Jacob P. Wright
by Prindle and Russell
his Attorney
THE NATIONAL LITHOGRAPHING COMPANY,
WASHINGTON, D. C.

UNITED STATES PATENT OFFICE.

JACOB P. WRIGHT, OF NEW HAVEN, CONNECTICUT.

MATCH-BOX.

SPECIFICATION forming part of Letters Patent No. 521,903, dated June 26, 1894.

Application filed August 1, 1893. Serial No. 482,088. (No model.)

*To all whom it may concern:*

Be it known that I, JACOB P. WRIGHT, a citizen of the United States, residing at New Haven, in the county of New Haven, and in the State of Connecticut, have invented certain new and useful Improvements in Match-Boxes; and I do hereby declare that the following is a full, clear, and exact description thereof, reference being had to the accompanying drawings, in which—

Figure 1 shows a perspective view of a box made in accordance with my invention; Fig. 2, a view of a cross section of the same on line *x x* of Fig. 1; Fig. 3, a view of a longitudinal section of the same; Fig. 4, a view of a transverse section of a modification of the box shown in the preceding figures; Fig. 5, a view of a longitudinal section of still another modification; Fig. 6 a view of a transverse section of one of my improved boxes, filled with matches, and Fig. 7, a similar view of one of the boxes as heretofore made, also filled.

Letters of like name and kind refer to like parts in each of the figures.

The object of my invention has been to provide an improved box for boxing matches, and, to this end, my invention consists in the box, constructed and arranged as hereinafter specified.

As will be seen, from the drawings and the description hereinafter given, my invention relates to the match receiving and holding part or the box proper, without reference to the form of cover or shuck, that may be used with it.

In practice, boxes for holding matches have been usually made of straw-board, and that is the material which I prefer to use, for my special form of box to be described, though I do not limit myself thereto.

In making match-boxes from straw-board or other material, it has been customary, heretofore, to form the box from one piece or blank, cut so as to have a rectangular body, to form the box-bottom, and projecting portions to be bent up, to form the box sides and ends. Of such portions, the ones to form the sides have been provided with pieces projecting from their ends, which, being bent inward at right angles, have lapped over and been pasted or otherwise fastened to the inner face of the box ends, in the manner indicated in Fig. 1, which shows my box with its sides and ends connected in the usual way. I desire it to be understood, however, that this special way of connecting the sides and ends of the box forms no essential part of my present invention, and can be departed from, as desired, without materially affecting said invention, which has to do particularly with the form and configuration of the lower part or bottom of the box, intended and adapted to secure certain advantageous results hereinafter set forth.

In the boxes, as made heretofore, the bottom, formed of a plain piece of the material, has been found to take the shape indicated by Fig. 7, which shows a cross section of one of the ordinary boxes, in which matches have been put up for the market. Instead of being flat and standing in a plane at right angles to the sides, it is bent or bowed down; so that the matches of the lower layer in the box contents are supported by it only at their opposite ends. Having this form, it cannot engage and support the body of the match-splints, which, as is well known are substantially uniform in size, and would tend to lie parallel to each other on any flat supporting surface.

As only the opposite ends of the matches rest upon the bottom, and the head ends are both larger than the others and apt to vary in size, it will be seen that the matches must lie with one end higher than the other, and be neither parallel to each other, nor in a plane at right angles to the box sides, or parallel to the box top. With the opposite ends of the lower matches, by which the rest of the box contents are supported, differing in size, it is obvious, that a shaking or jarring of the box, such as would be given the latter, to shake its contents down, would tend to make the larger and smaller ends of such matches travel different distances on the box bottom, and so cause the bodies or splints of the matches to take positions not parallel with the box ends. It has been found, therefore, difficult to fill the boxes, as heretofore made, quickly and well, with the contents settled down closely into place.

With the box bottom bowed or bent down, as usual in the boxes heretofore used, it has been impossible, without great care and the expenditure of an undesirable amount of time, to secure any uniformity in the contents of different boxes. To avoid these objections to the boxes previously made and employed for boxing matches for the market, I have devised the present improved box, which will afford a flat horizontal surface to engage squarely and support the bodies or splints of the matches, so that they will lie flat and horizontally in the box, with their opposite ends at the same height.

In the drawings A designates the bottom of the box, having connected with it the upturned ends $A'$ $A'$ and sides $A^2$ $A^2$, which latter parts are attached to the ends by projecting portions or lips $A^3$ $A^3$, pasted or otherwise secured to the inner faces of the ends. The bottom, instead of being made, as heretofore, has its central portion raised above that immediately adjoining and connecting it with the box sides and ends; so that a flat elevated table is presented for the reception and support of the bodies or splints of the matches, and the bottom has, along the sides of such table, depressions $a\,a$, to accommodate the under sides of the match-heads; so that the matches will not be supported at one end by the latter, as in the old boxes formerly made and used.

In practice, I prefer to give the bottom of my box the described form and construction, during the manufacture of the box from the blank, by means of suitable dies, adapted to set up or raise a portion of the bottom forming part of the blank above the rest, as set forth clearly in the pending application for United States Patent, Serial No. 479,863 July 7, 1893, filed by E. B. Beecher and myself; but I do not limit myself to such manner of or means for giving the box bottom its specified shape. While, if desired, one only of the depressions along the sides of the bottom could be made wide and deep enough, to accommodate the under portions of the heads of the lower matches in the box, I prefer to make both side depressions of such width and depth; as the other construction would necessitate care in placing the matches always with their heads toward one side of the box. The depressions along the ends of the elevated table part of the bottom can be of the same shape and width, as those along the sides, as indicated in Fig. 3; or they can be made narrower, in the manner indicated in Fig. 5, so that no match could get down into them. The depressions $a\,a$ and $a'\,a'$ can be made of any desired shape in cross section.

The shape indicated in Figs. 1, 2 and 3 is the one I prefer for the depressions; but that shown in Fig. 4, or any other suitable one, can be used, instead, as desired.

With a match-box made in accordance with my invention shown and described, it has been found that a good flat supporting surface for the matches can be secured, and that the bottom, as formed, is stiffened and held in shape by the bends in the material all around the elevated part, which serve, also, to a considerable extent, to stiffen and keep the rest of the box, the sides and ends, in proper position. As the raised part forms a flat table, to receive and support the bodies or splints of the matches squarely, while the heads are beyond its sides, over one of the depressions $a\,a$, and not supported and rolling upon any surface; it has been found, in practice, that the matches can be fed into the box and settled down into parallel position, to closely fill the box interior, much more quickly and easily, than when the matches are, as in the boxes heretofore made and used, supported on the bottom only at their opposite ends, with the heads of the lowest matches engaging such bottom, and supporting therefrom the corresponding ends of the matches above therein.

The matches, as their splints come squarely upon the flat raised table of my box bottom, tend to take their proper position, at right angles to the box sides, and, if any do not lie quite straight, a slight jar or movement of the box will make them do so at once.

Another advantageous result of constructing the box, in accordance with my invention, is, that, with the bottom supporting the splint or body portions of the matches only, the match receiving capacity of the boxes can be made more uniform, than heretofore; since, as is well known, the splints are quite regular in size and shape; while the match-heads vary more in each of these particulars.

In my box, the match holding capacity is made to depend more upon the size of the splints, than is possible in the case of the old boxes, and, consequently, it can be made more uniform for all my boxes, a result most desirable in boxing matches, where counting, to determine the number to go into a box, is out of the question, and the box itself is used as a measure whose receiving capacity alone determines the quantity or number of the matches to be put into it.

By supporting the matches, from the bottom, by their bodies, and accommodating the heads by the depressions $a\,a$, instead of partially supporting them by their heads, I can have the top of the box contents more level, and prevent the heads of the matches, in the upper layer, from being raised so far above the other ends, as they are in the boxes heretofore used.

Having thus described my invention, what I claim is—

1. A box for matches having a bottom, with a raised portion, to engage and support the bodies or splints of the matches, and a depression along the side of such portion, adapted to accommodate the lower side of the head of a match, so that the match body may rest squarely upon the raised portion of the box bottom, substantially as and for the purpose described.

2. A box for matches having a bottom with a raised portion, to engage and support the bodies or splints of the matches, and depressions along both sides of such portion to accommodate the under sides of the heads of matches whose bodies rest upon the raised portion, substantially as and for the purpose described.

3. A box for matches having the bottom with the raised central portion, to form a flat table to engage and support the bodies or splints of the matches, connected with the box sides and ends by downwardly bent portions, which, along the sides of the box, are made wide enough to accommodate the under sides of the heads of the matches resting on the raised central portion of the bottom, substantially as and for the purpose described.

4. A box for matches having its sides and ends connected in any suitable manner and a bottom with its central portion struck up, to form a raised table with depressed portions extending around the sides of the raised portion and connected with the box sides and ends, substantially as and for the purpose described.

In testimony that I claim the foregoing I have hereunto set my hand this 7th day of July, 1893.

JACOB P. WRIGHT.

Witnesses:
GEORGE E. BEERS,
THOS. H. SULLIVAN.